United States Patent
Sotsu

(10) Patent No.: US 8,280,240 B2
(45) Date of Patent: Oct. 2, 2012

(54) ELECTRONIC FLASH DEVICE AND IMAGE PICKUP APPARATUS PROVIDED WITH ELECTRONIC FLASH DEVICE

(75) Inventor: Shigeaki Sotsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/985,727

(22) Filed: Jan. 6, 2011

(65) Prior Publication Data
US 2011/0188848 A1    Aug. 4, 2011

(30) Foreign Application Priority Data
Jan. 29, 2010    (JP) .................................. 2010-018855

(51) Int. Cl.
G03B 15/03    (2006.01)
G03B 17/00    (2006.01)
(52) U.S. Cl. ....................................... 396/177; 396/542
(58) Field of Classification Search .................. 396/177, 396/542
See application file for complete search history.

(56) References Cited

U.S. PATENT DOCUMENTS
2007/0170869 A1* 7/2007 Ina et al. .................... 315/200 A

FOREIGN PATENT DOCUMENTS
JP    2006-098980    4/2006
* cited by examiner

Primary Examiner — Clayton E Laballe
Assistant Examiner — Noam Reisner
(74) Attorney, Agent, or Firm — Cowan, Liebowitz & Latman, P.C.

(57) ABSTRACT

An electronic flash device that is capable of preventing an electric leak from a secondary electrode section or a circuit board pattern that is electrically connected with the secondary electrode section to conductive materials such as a surrounding metal exterior and a metallic frame in a downsized electronic flash device. An electronic component has a high voltage section for emitting an emission section. A circuit board contains the electronic component. An insulating member covers the high voltage section of the electronic component. The insulating member is extended to a side of the circuit board that is opposite to the side on which the electronic component is contained at an outer edge section of the circuit board close to the high voltage section.

11 Claims, 7 Drawing Sheets

ELECTRONIC FLASH DEVICE AND IMAGE PICKUP APPARATUS PROVIDED WITH ELECTRONIC FLASH DEVICE

BACKGROUND OF THE INVENTION

1. Field of the Invention

The present invention relates to an electronic flash device and to an image pickup apparatus provided with this electronic flash device.

2. Description of the Related Art

In recent years, a compact electronic flash unit is required in response to a demand for downsizing an image pickup apparatus such as a digital camera. A flash unit mounted on a digital camera is provided with a trigger coil for emitting a xenon tube. Since the trigger coil generates a high voltage, it is necessary to keep a sufficient creepage distance between the trigger coil and a conductive element, when arranging the conductive element near the trigger coil. However, when the sufficient creepage distance is kept by increasing an air clearance, there is a problem of increasing the size of the flash unit. Therefore, in order to solve this problem, a technique that secures the creepage distance by covering the trigger coil, which is mounted on a flash substrate constituting the flash unit, by an insulation cap formed of an insulating member is proposed (for example, see Japanese Laid-Open Patent Publication (Kokai) No. 2006-98980 (JP 2006-98980A)).

In recent years, a liquid crystal display section arranged in a camera back becomes wider in a horizontal direction, which requires a product of which a height in a vertical direction is suppressed. In a conventional digital camera of which the flash emission section (referred to as an "emission section") is fixed, there is no space to arrange elements other than a main capacitor under the emission section on which an emission circuit is arranged. On the other hand, in a case where the emission section moves up and down with respect to a camera body (what is called a pop-up flash), a metallic frame for moving the trigger coil has to be arranged behind the emission section closely in order to downsize the emission section. Therefore, a trigger coil of surface mounting type of which a secondary electrode section is contained on a circuit board is used so that the circuit board on which the trigger coil is mounted is miniaturized.

However, when the secondary electrode section of the trigger coil as a high voltage section is contained on the circuit board, the covering of the trigger coil by the insulation cap as disclosed in the above-mentioned publication is insufficient to keep the creepage distance in the downsized electronic flash device. Therefore, an electric leak may occur from the secondary electrode section or the circuit board pattern that is electrically connected with the secondary electrode section to conductive materials such as a surrounding metal exterior and a metallic frame.

SUMMARY OF THE INVENTION

The present invention provides an electronic flash device and an image pickup apparatus provided with this electronic flash device that are capable of preventing an electric leak from the secondary electrode section or the circuit board pattern that is electrically connected with the secondary electrode section to conductive materials such as a surrounding metal exterior and a metallic frame in a downsized electronic flash device.

Accordingly, a first aspect of the present invention provides an electronic flash device comprising an electronic component configured to have a high voltage section for emitting an emission section, a circuit board configured to contain the electronic component, and an insulating member configured to cover the high voltage section of the electronic component, wherein the insulating member is extended to a side of the circuit board that is opposite to the side on which the electronic component is contained at an outer edge section of the circuit board close to the high voltage section.

Accordingly, a second aspect of the present invention provides an image pickup apparatus comprising an electronic component configured to have a high voltage section for emitting an emission section, a circuit board configured to contain the electronic component, and an insulating member configured to cover the high voltage section of the electronic component, wherein the insulating member is extended to a side of the circuit board that is opposite to the side on which the electronic component is contained at an outer edge section of the circuit board close to the high voltage section.

According to the present invention, an electric leak from the secondary electrode section or the circuit board pattern that is electrically connected with the secondary electrode section to conductive materials such as a surrounding metal exterior and a metallic frame can be prevented even when the electronic flash device is downsized.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
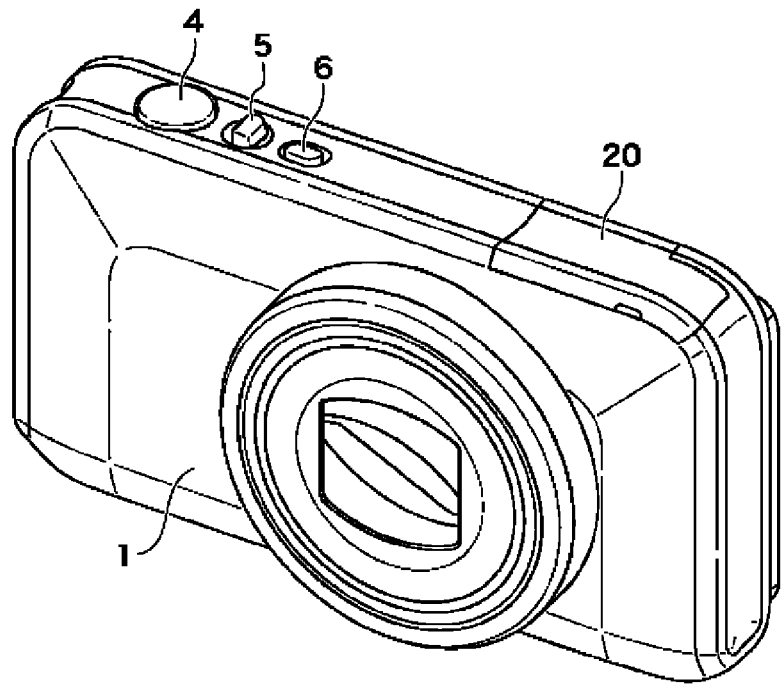
FIG. 1A is a front perspective view of a body part of a digital camera provided with an electronic flash device according to a first embodiment of the present invention, and shows a retracted condition of a flash emission section.
Figure 1B:
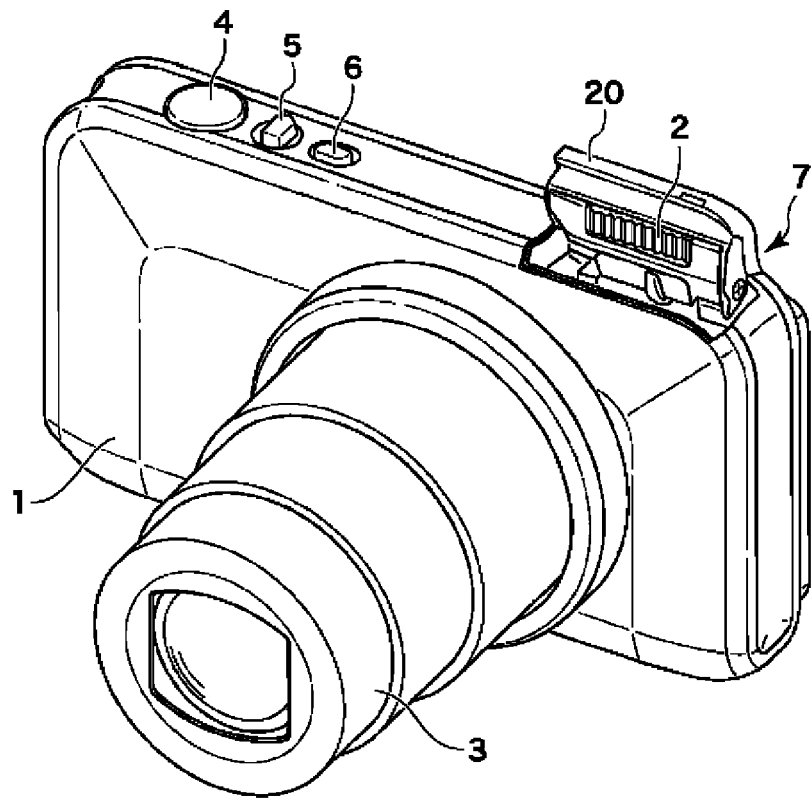
FIG. 1B is a front perspective view of the body part of the digital camera in FIG. 1A, and shows a stand-up condition of the flash emission section.
Figure 2:
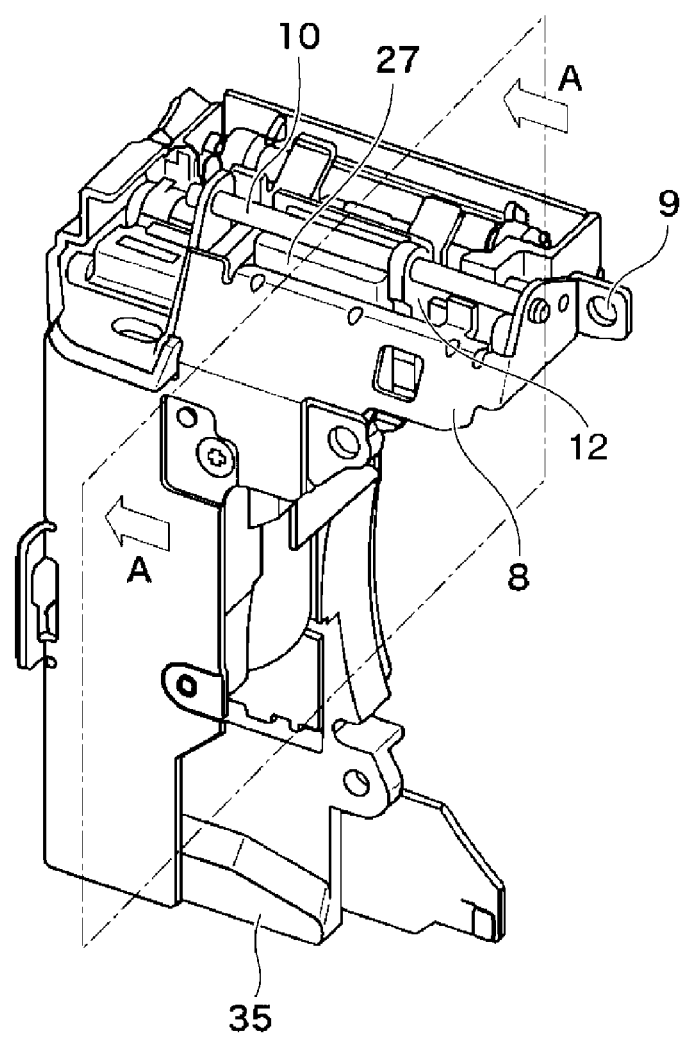
FIG. 2 is a back perspective view of the electronic flash device of the digital camera shown in FIG. 1, and shows a condition where the flash emission section is retracted in the body part of the digital camera.
Figure 3:
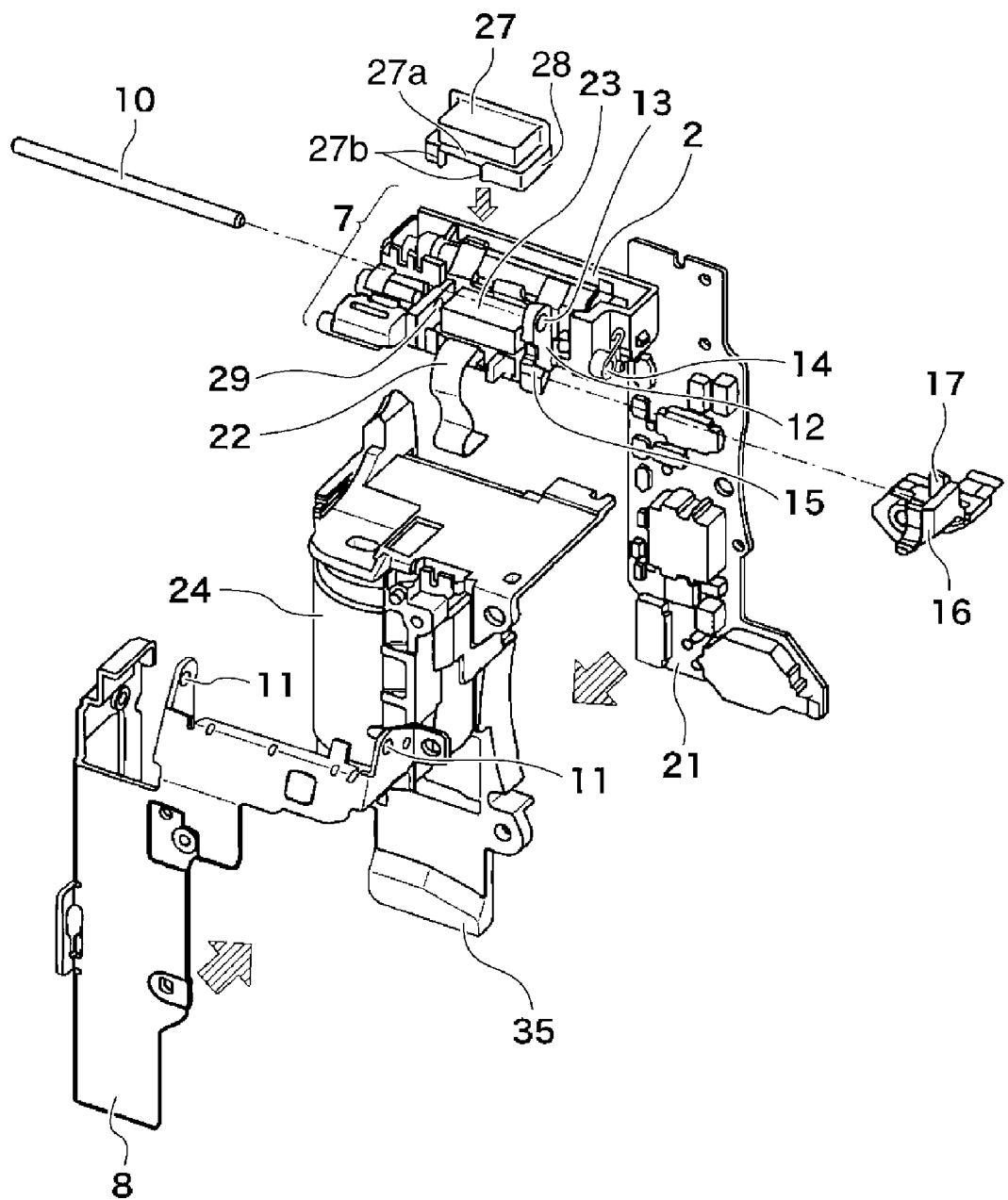
FIG. 3 is an exploded perspective view of the electronic flash device shown in FIG. 2.
Figure 4:
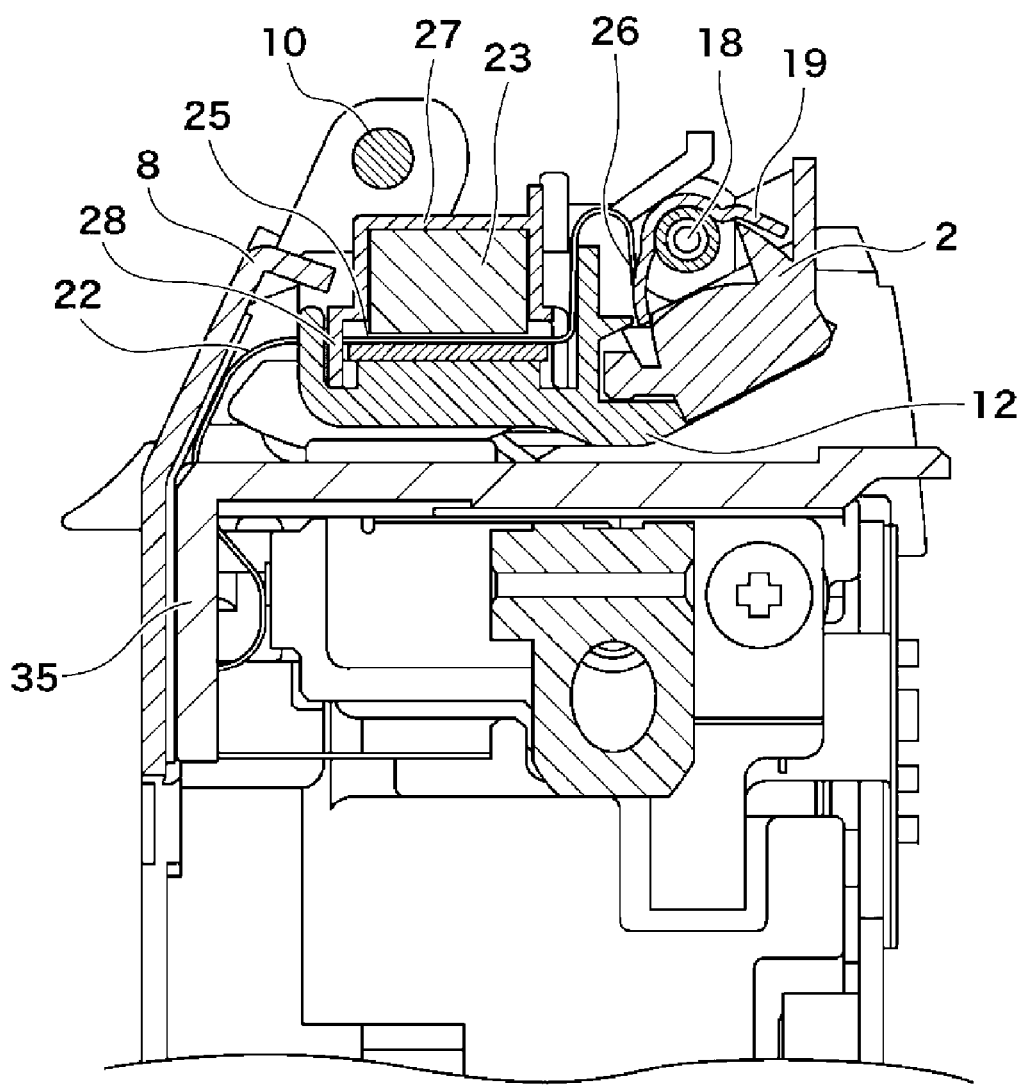
FIG. 4 is a sectional view of the electronic flash device in FIG. 2 when cutting by a plane of an alternate long and short dash line and viewing in a direction of an arrow A.

FIG. 1A is a front perspective view of a body part of a digital camera provided with an electronic flash device according to a first embodiment of the present invention, and shows a retracted condition of a flash emission section. FIG. 1B is a front perspective view of the body part of the digital camera in FIG. 1A, and shows a stand-up condition of the flash emission section. FIG. 2 is a back perspective view of the electronic flash device of the digital camera shown in FIG. 1, and shows a condition where the flash emission section is retracted in the body part of the digital camera. FIG. 3 is an exploded perspective view of the electronic flash device shown in FIG. 2. FIG. 4 is a sectional view of the electronic flash device in FIG. 2 when cutting by a plane of an alternate long and short dash line and viewing in a direction of an arrow A. Hereafter, a "flash emission section" is abbreviated to an "emission section".

As shown in FIG. 1A and FIG. 1B, the body part 1 of the digital camera is provided with an electronic flash device having the emission section 7, a lens barrel 3 that constitutes an image pickup optical system, a shutter button 4, a zoom lever 5 that a user directs a power varying operation, and a power button 6 that the user turns on and off the power of the body part 1. It should be noted that a liquid crystal display panel, operation buttons, etc. (not shown) are arranged on the back side of the body part 1.

The electronic flash device with which the body part 1 is provided is what is called a pop-up flash type. The emission section 7 is movable with respect to the body part 1 between a retracted position shown in FIG. 1A and a stand-up position shown in FIG. 1B. It should be noted that FIGS. 2 through 4 show the condition where the emission section 7 is in the retracted position, but the emission section 7 moves to the stand-up position at the time of use of the electronic flash device.

When the power of the body part 1 is OFF (for example, the condition shown in FIG. 1A) or when the emission section 7 does not operate, the emission section 7 is in the retracted position and is not projected from the body part 1, which enables to constitute a compact digital camera. Since the emission section 7 moves to the stand-up position shown in FIG. 1B at the time of emission, parts that constitute the lens barrel (for example, a fixed barrel and a moving barrel) do not shade flash light.

Next, a pivot moving mechanism of the emission section 7 with respect to the body part 1 will be described.

As shown in FIG. 4, the emission section 7 is provided with a xenon tube 18 that emits light, a Fresnel lens 2 and a reflector 19 that adjust luminous intensity distribution, and a holder 12 that contains them. A flash cover 20 covers over these elements as shown in FIG. 1B.

As shown in FIG. 2, a plate 8 that constitutes the electronic flash device is made of stamped metal (for example, stainless steel etc.). The plate 8 is attached to the body part 1 by an attaching means (not shown) through a screw hole 9 formed therein. A shaft 10 is inserted through holes 11 (see FIG. 3) formed in the plate 8, and is pivotally supported by the plate 8. The holder 12 that constitutes the emission section 7 is pivotally supported around the shaft 10 by inserting the shaft 10 through a hole 13 formed in the holder 12. Thus, the emission section 7 pivots about the shaft 10 as a rotation center with respect to the body part 1.

As shown in FIG. 3, a spring 14 (here a torsion spring) is used as an urging member for urging the holder 12 in a stand-up direction at the stand-up position and a retracting direction at the retracted position, respectively. A cylindrical cam 15 formed in the holder 12 is located in a U-shaped portion formed in a link 16. The link 16 is pivotally supported by a shaft (not shown), and moves in an optical axis direction while interlocking with extension and retraction of the lens barrel 3.

When the power button 6 is depressed and the power of the body part 1 turns ON, the link 16 moves in the direction toward a subject (frontward in the optical axis direction) according to the extension of the lens barrel 3, and a back inside face (not shown) of the U-shaped portion of the link 16 contacts the cam 15 of the holder 12. The holder 12 pivots about the shaft 10 as a rotation center by pressing the cam 15.

In this way, the emission section 7 pops up to the stand-up position. When the power of the body part 1 is turned OFF, the link 16 moves in the direction toward a photographer (backward in the optical axis direction) according to the retraction of the lens barrel 3, and a front inside face 17 of the U-shaped portion of the link 16 contacts the cam 15 of the holder 12. The holder 12 rotates the shaft 10 as a rotation center by pressing the cam 15. In this way, the emission section 7 is retracted into the retracted position.

Next, an emitting circuit for the electronic flash device will be described. The emitting circuit has, as shown in FIG. 3, a structure where electrical components such as a transformer etc. are contained on a hard circuit board 21 and a trigger coil 23, which is an electronic component having a high voltage section, is contained on a flexible circuit board 22. The flexible circuit board 22 is connected to the hard circuit board 21 with solder. A main capacitor 24, the hard circuit board 21, and the plate 8 are fixed to predetermined positions of a flash base 35 that supports the emission section 7. The main capacitor 24 is connected to the hard circuit board 21 through lead wires (not shown). The xenon tube 18 is connected to the hard circuit board 21 through lead wires.

As shown in FIG. 4, an output pin 25 of a secondary electrode that is a high voltage section of the trigger coil 23 is contained on the flexible circuit board 22, and is electrically connected to an opening of a tongue-shaped copper-foil-pattern aperture via the copper foil patterns in the flexible circuit board 22. A tongue piece part 26 of the flexible circuit board 22 is in contact with the reflector 19, and the high voltage of about 4 kV generated in the output pin 25 at the time of emission of the emission section 7 is conducted to the reflector 19 via the flexible circuit board 22 and the tongue piece part 26. The trigger coil 23 is covered with a coil cap 27 which is an insulating member. The coil cap 27 is formed in approximately box-like shape from insulating material such as polypropylene.

Next, the creepage distance between the trigger coil 23 and the plate 8 will be described using FIG. 3 and FIG. 4. Since the air clearance between the output pin 25 of the secondary electrode of the trigger coil 23 and the plate 8 as conductive material is short, an electric leak from the output pin 25 to the plate 8 tends to occur when no measure is taken. Therefore, in the electronic flash device according to the first embodiment, the trigger coil 23 on the flexible circuit board 22 is covered with the coil cap 27 that has the nearly same shape as the outline of the trigger coil 23. At the outer edge section of the flexible circuit board 22 on which the output pin 25 of the trigger coil 23 is arranged, an extended part 28 of the coil cap 27 is extended to the side of the flexible circuit board 22 that is opposite to the side on which the trigger coil 23 is contained. That is, the coil cap 27 is provided with the extended part 28 extended to the side of the flexible circuit board 22 that is opposite to the side on which the trigger coil 23 is contained except for the section along which the flexible circuit board 22 passes at the side close to the plate 8 as shown in FIG. 3.

As shown in FIG. 3, the coil cap 27 is provided with an upper wall 27a covering over the flexible circuit board 22 and side walls 27b surrounding the sides of the flexible circuit board 22 at the section where the extended part 28 is not formed so as to allow the passage of the flexible circuit board 22.

Accordingly, a sufficient creepage distance from the output pin 25 to the plate 8 can be kept along the extended part 28, the upper wall 27a, and the side walls 27b of the coil cap 27. In this way, since the sufficient creepage distance can be kept without increasing the air clearance, prevention of an electric leak from the secondary electrode section or the circuit board pattern that is electrically connected with the secondary electrode section to conductive materials such as a surrounding metal exterior and a metallic frame is compatible with downsizing of the electronic flash device.

Next, a fixing method of the flexible circuit board 22 to the holder 12 will be described. In this embodiment, the flexible circuit board 22 is not positioned nor fixed to the holder 12 directly. The fixed position of the coil cap 27 is appointed by fitting the coil cap 27 into a hook 29 (see FIG. 3) provided in the holder 12. The coil cap 27 is pressing down the trigger coil 23 that is adhered to the flexible circuit board 22. This indirectly positions and fixes the flexible circuit board 22 at a certain position with respect to the holder 12. Use of such a configuration enables to fix the flexible circuit board 22 to the holder 12 without using a means like a double-sided tape for fixing the flexible circuit board 22.

Figure 5:
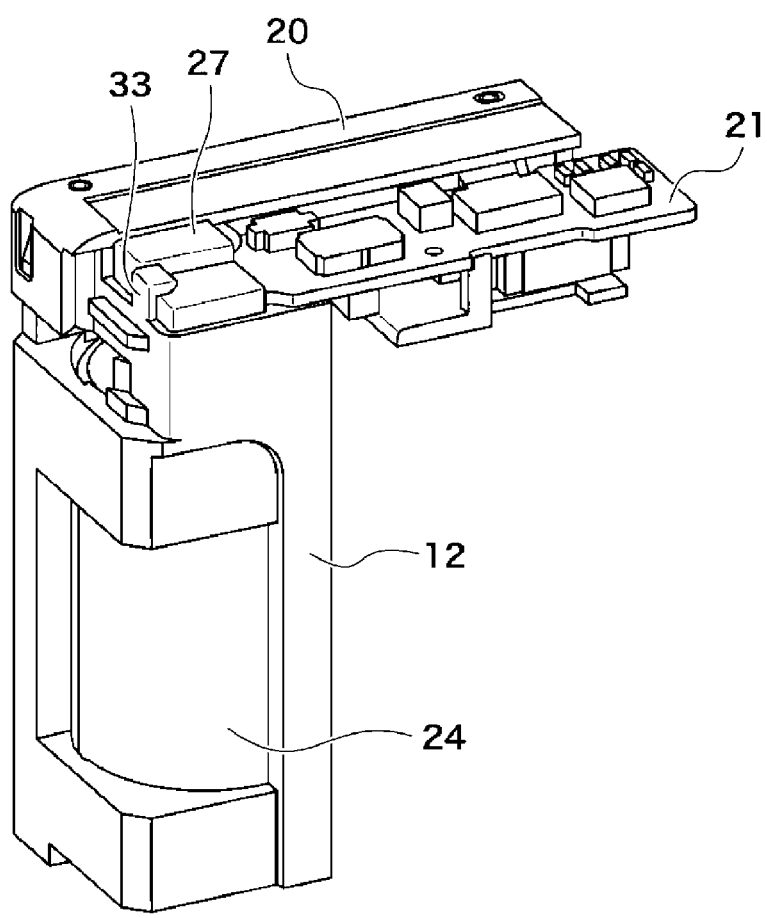
FIG. 5 is a back perspective view of an electronic flash device according to a second embodiment of the present invention.
Figure 6:
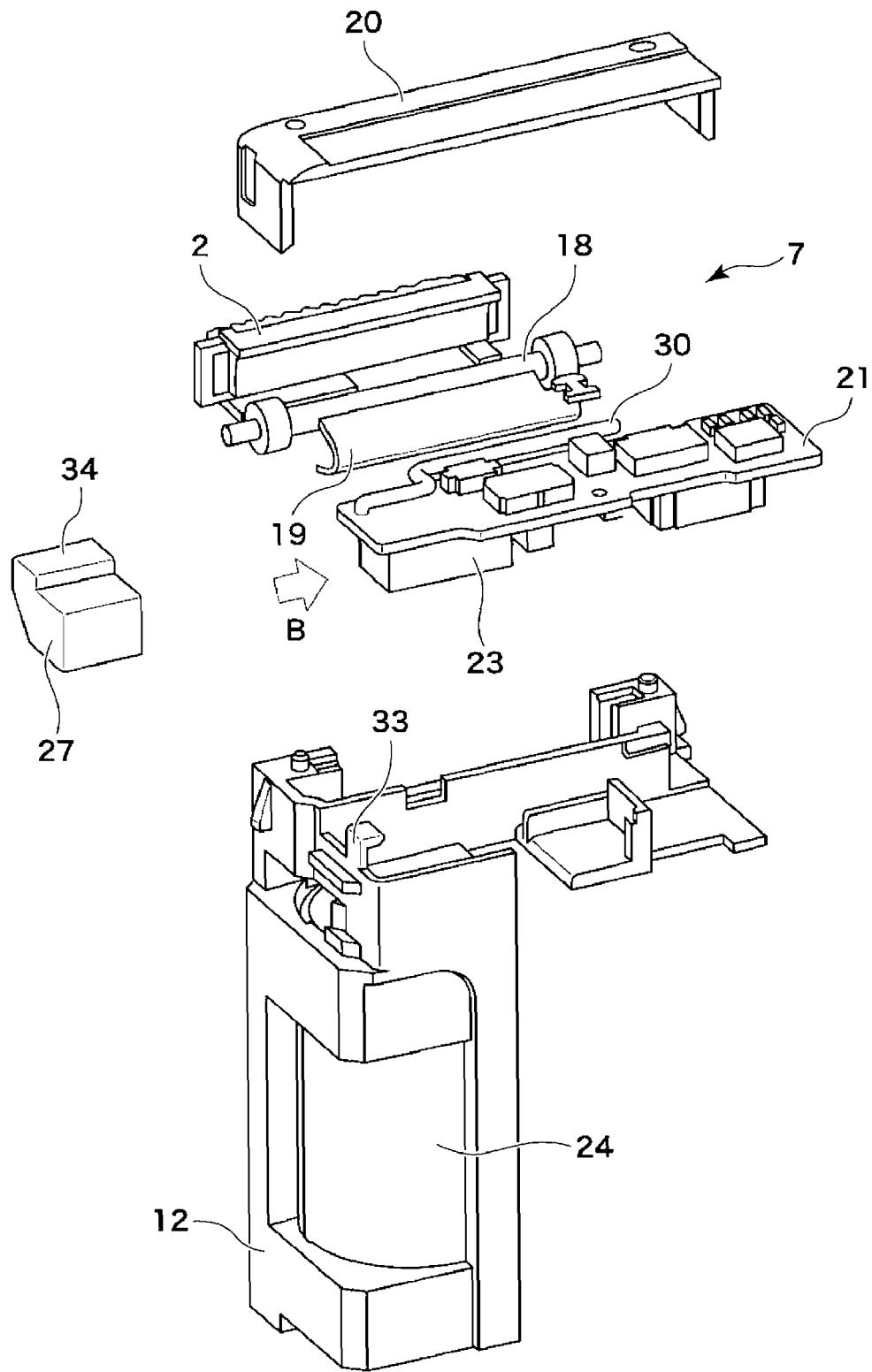
FIG. 6 is an exploded perspective view of the electronic flash device shown in FIG. 5.
Figure 7:
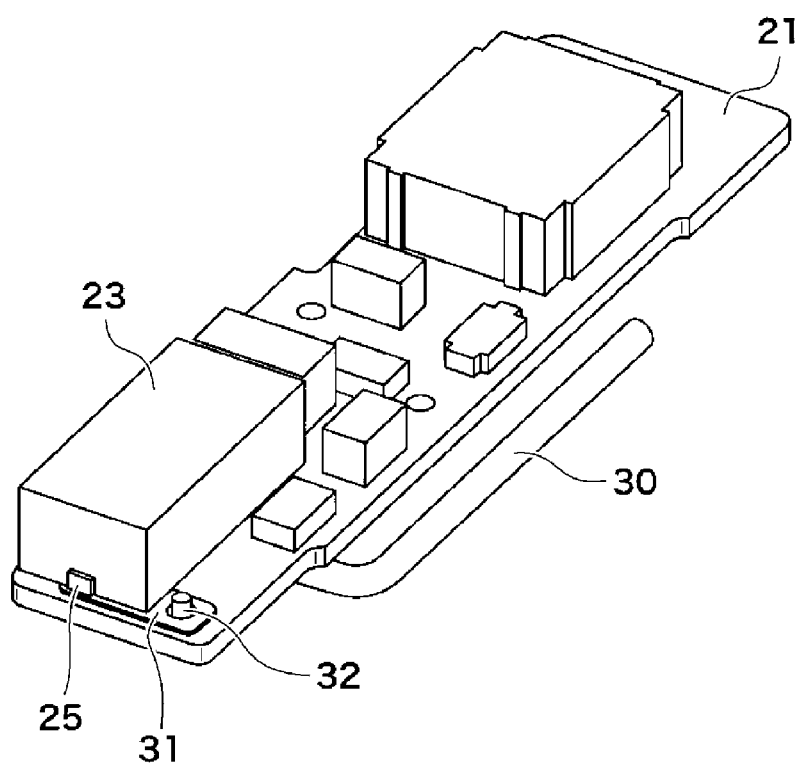
FIG. 7 is a perspective view of a circuit board used in the electronic flash device shown in FIG. 6.

FIG. 5 is a back perspective view of an electronic flash device according to a second embodiment of the present invention. FIG. 6 is an exploded perspective view of the electronic flash device shown in FIG. 5, and is seen from the back like FIG. 5. FIG. 7 is a perspective view of the circuit board used in the electronic flash device shown in FIG. 6, and is the view of the circuit board in FIG. 6 turning downside up and is viewed in a direction of an arrow B in FIG. 6. It should be noted that an element in the electronic flash device of the second embodiment that has similar function to an element in the electronic flash device of the first embodiment has the same name and reference number as that in the first embodiment.

An emission section 7 of the electronic flash device of the second embodiment mainly consists of a xenon tube 18 that emits light, a Fresnel lens 2 and a reflector 19 that adjust luminous intensity distribution, a holder 12 that contains these element, and a horseshoe-shaped flash cover 20 that covers over the emission section 7.

An emitting circuit is constituted by containing electrical components such as a trigger coil 23 and a transformer on a hard circuit board 21 that has copper foil patterns in both sides, and a main capacitor 24 is connected with the hard circuit board 21 through lead wires (not shown). One end of a trigger cable 30 as a lead wire transmitting high voltage current is connected to the reflector 19, and the other end is electrically connected to the hard circuit board 21 at a solder part 32.

An output pin 25 of a secondary electrode of the trigger coil 23 is electrically connected to a copper foil pattern 31 on the hard circuit board 21. In the output pin 25, the high voltage of about 4 kV is generated at the time of emission of the emission section 7, and the generated voltage is transmitted to the reflector 19 through the hard circuit board 21 and the trigger cable 30. The trigger coil 23 is contained on the hard circuit board 21 so that the output pin 25 is located at the edge of the hard circuit board 21. A coil cap 27, which is a box-like shaped insulating member formed from polypropylene, is disposed so as to cover the output pin 25 and the copper foil pattern 31 that are high voltage sections and so as to contain the hard circuit board 21 and the trigger coil 23. That is, an extended part of the coil cap 27, which corresponds to the extended part 28 in the first embodiment, is formed so as to cover the side of the hard circuit board 21 that is opposite to the side on which the trigger coil 23 is contained.

Such a configuration keeps a sufficient creepage distance from the high voltage sections such as the output pin 25 of the trigger coil 23, the copper foil pattern 31, and the soldering unit 32 of the trigger cable 30 to a conductive material (not shown) such as a chassis and a metal exterior. In this way, in the electronic flash device of the second embodiment, prevention of an electric leak from the secondary electrode section or the circuit board pattern that is electrically connected with the secondary electrode section to conductive materials such as a surrounding metal exterior and a metallic frame is compatible with downsizing of the electronic flash device. That is, since the coil cap 27 as an insulating member is formed in the box-like shape corresponding the outline of the trigger coil 23 and covers the high voltage section with the hard circuit board 21, the high voltage section can be surrounded compactly, and the sufficient creepage distance can be kept while saving space.

The inside dimension of the coil cap 27, which is made from polypropylene as an elastic material (a soft material that is easy to deform elastically), is nearly equal to the width of the hard circuit board 21, and the coil cap 27 is put on the hard circuit board 21 by light press fit. Since the coil cap 27 put on the hard circuit board 21 does not fall out easily, omission of the coil cap 27 in an assembly process can be prevented. Since there is little clearance between the coil cap 27 and the hard circuit board 21, the electronic flash unit can be miniaturized.

Next, a fixing method of the hard circuit board 21 to the holder 12 will be described. Conventionally, an uneven shape was formed on the hard circuit board 21, and the hard circuit board 21 was fixed to the holder 12 by hooking a hook 33 formed in the holder 12 onto the uneven shape formed on the hard circuit board 21, for example.

As compared with this, in the second embodiment, although the hard circuit board 21 does not have the uneven shape for hooking the hook 33, the hard circuit board 21 is fixed to the holder 12 by hooking the hook 33 of the holder 12 onto the coil cap 27 that has been united with the hard circuit board 21 by press fit.

In this way, downsizing of the hard circuit board 21 and fixing of the hard circuit board 21 to the holder 12 are achieved without forming an uneven shape on the hard circuit board 21. Since the coil cap 27 is also fixed to the holder 12 by fixing the hard circuit board 21 to the holder 12, omission of the coil cap 27 is prevented. It should be noted that the other fixing part of the hard circuit board 21 can employ the conventional structure where the hook of the holder 12 hooks onto the uneven shape formed on the hard circuit board 21 in the second embodiment.

The shape of the coil cap 27 is preferably designed so as to minimize clearances among the inner wall of the coil cap 27, the hard circuit board 21, and the trigger coil 23. Therefore, the coil cap 27 has a projection part 34 that is formed only along a path through which the trigger cable 30 passes, and the trigger cable 30 is accommodated therein. In this way, the path of the trigger cable 30 that transfers the high voltage current can be aligned, and the position of the trigger cable 30 can be fixed.

According to this embodiment, since the output pin 25 of the trigger coil 23 that is the high voltage section is arranged near one end of the trigger coil 23 in a longitudinal direction, the sufficient creepage distance is kept even if the other end of the trigger coil 23 is not covered by the coil cap 27. Accordingly, the length of the coil cap 27 in the longitudinal direction is shorter than the length of the trigger coil 23 in the longitudinal direction. However, the length of the longitudinal direction of the coil cap 27 of a master may be rather than the length of the longitudinal direction of the trigger coil 23.

Other Embodiments

Although the embodiments of the invention have been described, the present invention is not limited to the above-mentioned embodiments, and may be suitably changed as long as the concept of the present invention is not deviated. For example, the material of the coil cap 27 is not limited to polypropylene, so resin provided with insulation performance and physical properties (softness etc.) equivalent to polypropylene can be used for the present invention.

Although the above-mentioned embodiments describe the case where the electronic flash device concerning the present invention is applied to a digital camera, it is not limited to this. The present invention can be widely applied to an electronic device provided with an electronic component that has a high voltage section located on a component side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-018855, filed on Jan. 29, 2010, which is hereby incorporated by reference herein in its entirety.

What is claimed is:

1. An electronic flash device comprising:
   an electronic component configured to have a high voltage section for emitting an emission section;
   a circuit board configured to contain said electronic component; and
   an insulating member configured to cover the high voltage section of said electronic component,
   wherein said insulating member is extended to one side of said circuit board that is opposite to the other side of said circuit board on which said electronic component is contained, at an outer edge section of said circuit board close to the high voltage section, and
   wherein said insulating member does not cover a part of the other side of circuit board.

2. The electronic flash device according to claim 1, wherein said circuit board is fixed at a predetermined position through said insulating member.

3. The electronic flash device according to claim 1, wherein said insulating member is formed so as to cover the side of said circuit board that is opposite to the side on which said electronic component is contained.

4. The electronic flash device according to claim 3, wherein said insulating member is made from elastic material, and is fixed to said circuit board by press fit.

5. The electronic flash device according to claim 3, wherein said insulating member has a projection part that contains and covers a lead wire for electrically connecting the high voltage section to a reflector that adjusts luminous intensity distribution from said emission section.

6. An image pickup apparatus comprising:
   an electronic component configured to have a high voltage section for emitting an emission section;
   a circuit board configured to contain said electronic component; and
   an insulating member configured to cover the high voltage section of said electronic component,
   wherein said insulating member is extended to one side of said circuit board that is opposite to the other side of said circuit board on which said electronic component is contained, at an outer edge section of said circuit board close to the high voltage section, and
   wherein said insulating member does not cover a part of the other side of circuit board.

7. The electronic flash device according to claim 1, wherein said insulating member is fitted into a hook provided in a holder in which a reflector is contained.

8. The electronic flash device according to claim 7, wherein said circuit board is positioned by said insulating member being fitted into the hook.

9. The electronic flash device according to claim 1, wherein said insulating member does not cover a part of a side of the high voltage section except the circuit board-facing part.

10. An electronic flash device comprising:
    an electronic component configured to have a high voltage section for emitting an emission section;
    a circuit board configured to contain said electronic component; and
    an insulating member configured to cover the high voltage section of said electronic component,
    wherein said insulating member is extended to a side of said circuit board that is opposite to the side on which said electronic component is contained, at an outer edge section of said circuit board close to the high voltage section, and
    wherein said insulating member is made from elastic material, and is fixed to said circuit board by press fit.

11. An image pickup apparatus comprising:
    an electronic component configured to have a high voltage section for emitting an emission section;
    a circuit board configured to contain said electronic component; and
    an insulating member configured to cover the high voltage section of said electronic component,
    wherein said insulating member is extended to a side of said circuit board that is opposite to the side on which said electronic component is contained, at an outer edge section of said circuit board close to the high voltage section, and
    wherein said insulating member is made from elastic material, and is fixed to said circuit board by press fit.

* * * * *